(12) United States Patent

Monroe

(10) Patent No.: US 12,691,937 B1

(45) Date of Patent: Jul. 28, 2026

(54) NESTED GAS SPRING ASSEMBLY

(71) Applicant: Jerry A. Edwards, Portland, OR (US)

(72) Inventor: Ryan Monroe, Gresham, OR (US)

(73) Assignee: Jerry Edwards, Portland, OR (US)

( * ) Notice: Subject to any disclaimer, the term of this patent is extended or adjusted under 35 U.S.C. 154(b) by 0 days.

(21) Appl. No.: 19/036,240

(22) Filed: Jan. 24, 2025

(51) Int. Cl.
B62D 7/22 (2006.01)
F16F 9/02 (2006.01)

(52) U.S. Cl.
CPC ............ B62D 7/228 (2013.01); F16F 9/0209 (2013.01)

(58) Field of Classification Search
CPC ............... B60G 5/12; B60G 2202/152; B60G 2202/314; F16F 9/0209; F16F 9/0245; B62D 7/228
See application file for complete search history.

(56) References Cited

U.S. PATENT DOCUMENTS

| | | | |
|---|---|---|---|
| 3,870,287 A | 3/1975 | McMahon | |
| 5,220,706 A * | 6/1993 | Bivens | E05F 3/02 |
| | | | 267/225 |

| | | | |
|---|---|---|---|
| 6,237,904 B1 * | 5/2001 | Shepherd | F16F 15/0232 |
| | | | 267/221 |
| 6,698,777 B1 * | 3/2004 | Shepherd | B62D 6/04 |
| | | | 180/421 |
| 10,328,971 B1 * | 6/2019 | Shepherd | B60D 1/245 |
| 10,683,033 B2 | 6/2020 | Shepherd | |
| 2005/0167939 A1 * | 8/2005 | Howard | B62D 7/228 |
| | | | 280/89.11 |
| 2012/0049470 A1 | 3/2012 | Rositch et al. | |
| 2021/0088100 A1 | 3/2021 | Woelfel | |
| 2023/0078355 A1 * | 3/2023 | Ferro | F16F 9/3214 |
| | | | 267/64.13 |

FOREIGN PATENT DOCUMENTS

| | | | |
|---|---|---|---|
| EP | 3399209 B1 | 11/2018 | |

* cited by examiner

*Primary Examiner* — James A English

(74) *Attorney, Agent, or Firm* — Erise IP, P.A.

(57) ABSTRACT

A nested gas spring assembly, device, and system including a first housing with a first hollow cavity for receiving a first gas spring rod. The first rod includes a second housing therein with a second hollow cavity for receiving a second gas spring rod that is biased in an opposite direction from the first rod.

20 Claims, 3 Drawing Sheets

NESTED GAS SPRING ASSEMBLY

BACKGROUND

1. Field

Embodiments of the present disclosure relate to gas spring assemblies. More specifically, embodiments of the present disclosure relate to gas spring assemblies with a dual directional nested configuration.

2. Related Art

Gas spring assemblies are used in applications such as vehicle steering stabilizers also referred to as steering dampers or centering stabilizers, to reduce vibrations and absorb force from the vehicle steering system during vehicle operation. However, currently available steering stabilizer assemblies typically either contain a single directional spring member or two distinct spring members that actuate in different directions. In steering stabilizer assemblies with two distinct spring members, the spring members are usually spread apart at each end of the assembly and, therefore, consume a large amount of space within the vehicle steering system making installation difficult and limiting the suitable mounting options.

SUMMARY

Embodiments of the present disclosure solve the above-mentioned problems by providing dual direction gas spring assembly with a nested arrangement in which gas spring rod of a first spring section acts as the housing for another gas spring rod that actuates in the opposite direction. Such an arrangement reduces the overall length needed to provide dual direction functionality and thereby alleviates the installation issues associated with two distinct gas spring members.

In some aspects, the techniques described herein relate to a nested gas spring assembly including an extension housing including a hollow cavity therein, an extension rod including a compression housing with a hollow cavity therein, wherein at least a portion of the extension rod is received into the hollow cavity of the extension housing, and a compression rod with at least a portion thereof received into the hollow cavity of the compression housing of the extension rod, wherein the extension rod is biased into the hollow cavity of the extension housing and the compression rod is biased out of the hollow cavity of the compression housing of the extension rod.

In some aspects, the techniques described herein relate to a gas spring assembly for a vehicle steering stabilizer system, the gas spring assembly including an extension housing including a hollow cavity, a compression rod, and an extension rod operable to be positioned within the hollow cavity of the extension housing, the extension rod including a compression housing including a hollow cavity for receiving the compression rod therein, wherein the extension rod is biased into the hollow cavity of the extension housing and the compression rod is biased out of the hollow cavity of the compression housing of the extension rod.

In some aspects, the techniques described herein relate to a nested gas spring assembly including an extension housing including a hollow cavity therein, an extension rod including a compression housing with a hollow cavity therein, wherein at least a portion of the extension rod is received into the hollow cavity of the extension housing, and a compression rod with at least a portion thereof received into the hollow cavity of the compression housing of the extension rod, wherein in an extension position a substantial portion of the extension rod is external to the hollow cavity of the extension housing and a substantial portion of the compression rod is external to the hollow cavity of the compression housing, wherein in a neutral position a substantial portion of the extension rod is internal to the hollow cavity of the extension housing and a substantial portion of the compression rod is external to the hollow cavity of the compression housing, and wherein in a compressed position a substantial portion of the extension rod is internal to the hollow cavity of the extension housing and a substantial portion of the compression rod is internal to the hollow cavity of the compression housing in the extension rod.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1A:
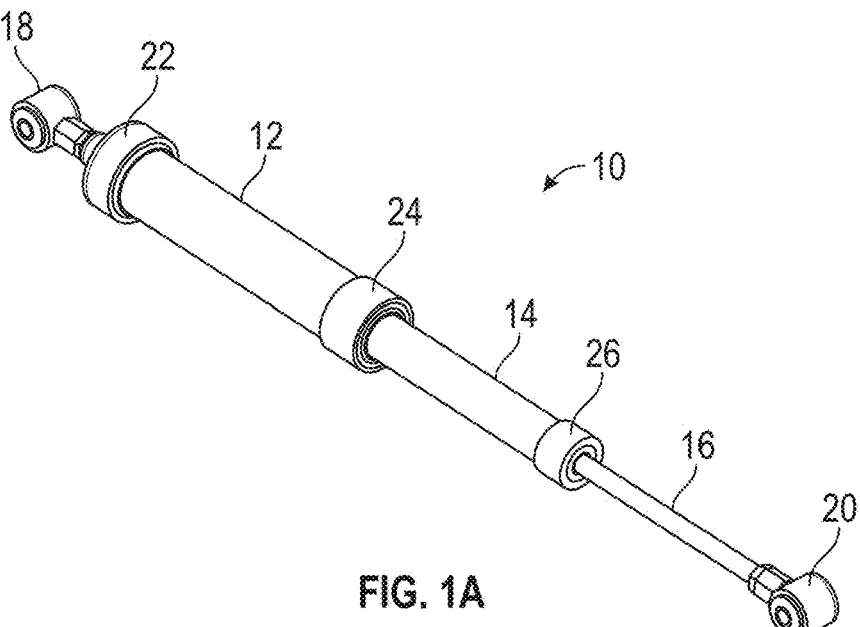
FIG. 1A illustrates an exemplary gas spring assembly in an extended position relating to some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure contemplate a nested gas spring assembly in which a single component acts as both an extension cylinder and compression housing. For example, in a compressed position, a compression rod of the gas spring assembly may be nested within a cavity inside of the extension rod that acts as a compression housing. As such, the nested gas spring assembly may comprise a substantially shorter overall length compared to traditional assemblies without a nested configuration. The shorter length improves the ease of installation, expands the potential installation locations, and opens space for other components.

In some embodiments, the nested gas spring assembly comprises a dual directional configuration operable to resist motion in two opposing directions. For example, the extension portion may be configured to resist external extension forces, while the compression portion is configured to resist external compressive forces. In some embodiments, the gas spring assembly, for example, may be installed within a vehicle steering system as a steering stabilizer. Here, the gas spring assembly may be operable to resist and absorb forces acting on the vehicle steering system.

Figure 1B:
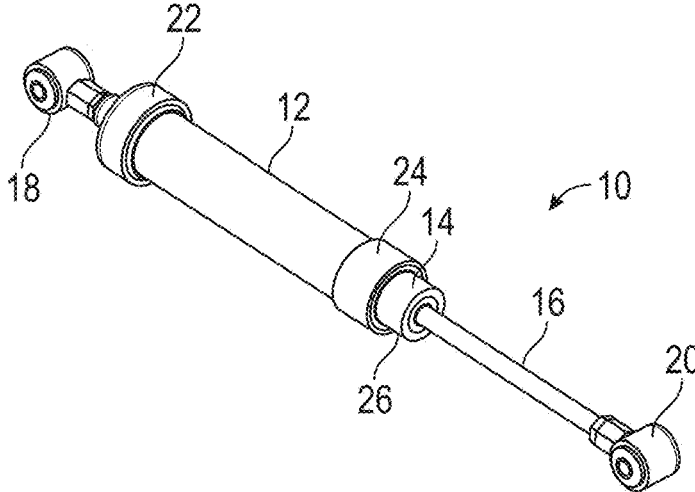
FIG. 1B illustrates an exemplary gas spring assembly in a neutral position relating to some embodiments.
Figure 1C:
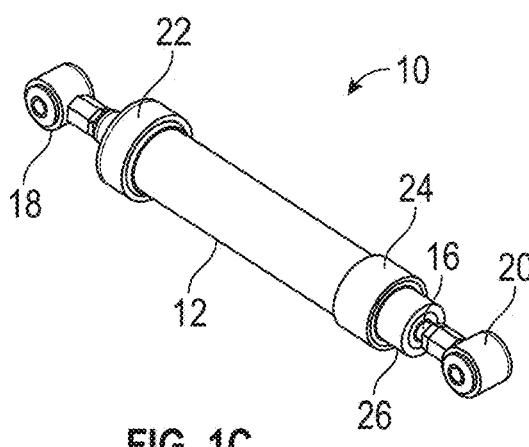
FIG. 1C illustrates an exemplary gas spring assembly in a compressed position relating to some embodiments.

FIGS. 1A-1C illustrate an exemplary gas spring assembly 10 in various operational positions relating to some embodiments. In some embodiments, the gas spring assembly 10 may be installed, for example, within a vehicle, such as, an automobile, or another suitable system. In such systems, the gas spring assembly 10 may act as a damper to absorb forces and vibration. For example, the gas spring assembly 10 may be installed within a vehicle steering system as a steering stabilizer to reduce vibrations within the vehicle steering system and to center the vehicle steering system.

FIG. 1A illustrates the exemplary gas spring assembly 10 in an extended position relating to some embodiments. The gas spring assembly 10 comprises an extension housing 12. The extension housing 12 may be hollow to receive an extension rod 14 of the gas spring assembly 10 therein. In some embodiments, the extension housing 12 comprises an elongate cylindrical-shape, as shown. However, it should be understood that other suitable shapes and lengths are also contemplated for the extension housing 12. For example, in some embodiments, components of the gas spring assembly 10 comprise an elongate rectangular prism shape (not shown).

In some embodiments, the extension rod 14 is also hollow to receive a compression rod 16 of the gas spring assembly 10 therein. For example, the extension rod 14 may act as both an extension member and a compression housing such that the compression rod 16 may be nested therein. Similar to the extension housing 12, the extension rod 14 may have an elongate cylindrical shape. However, the extension rod 14 may have a relatively smaller diameter compared to the extension housing 12 such that the extension rod 14 fits within a hollow inner portion of the extension housing 12. The compression rod 16 may also comprise an elongate cylindrical shape, as shown, with a smaller diameter compared to the extension rod 14 such that the compression rod 16 fits within a hollow inner portion of the extension rod 14.

In some embodiments, the gas spring assembly 10 further comprises connection points disposed at respective ends of the gas spring assembly 10. For example, a first connection point 18 may be disposed at a first end of the gas spring assembly 10 such as at an end of the extension housing 12 opposite the extension rod 14 and a second connection point 20 may be disposed at a second end of the gas spring assembly 10 such as at an end of the compression rod 16 opposite the extension rod 14. The connection points 18 and 20 may be used to mount the gas spring assembly 10 in place. For example, the connection points 18 and 20 may be used to couple the gas spring assembly 10 to respective portions of a vehicle steering system. In some embodiments, the connection points 18 and 20 comprise openings therein for receiving a bolt or coupling rod for installation of the gas spring assembly 10.

In the extended position, the extension rod 14 may be extended outwards from the extension housing 12 such that a substantial portion of the extension rod 14 is external to the hollow inner portion of the extension housing 12, as shown, and the compression rod 16 extended outwards from the extension rod 14 such that a substantial portion of the compression rod 16 is external to the hollow inner portion of the extension rod 14, as shown. In some embodiments, during use, the gas spring assembly 10 may be stretched into the extended position by external tensile forces acting through the connection points 18 and 20.

In some embodiments, the gas spring assembly 10 comprises one or more outer collar components disposed around portions of the cylindrical portions of the gas spring assembly 10. For example, in some embodiments, a first collar 22 is disposed around an end of the extension housing 12 distal to the extension rod 14, a second collar 24 is disposed around an end of the extension housing 12 proximal to the extension rod 14, and a third collar 26 is disposed around an end of the extension rod 14 distal to the extension housing 12, as shown. In some embodiments, the collars 22, 24, and 26 provide additional support to ends of the gas spring assembly 10 components and may also encase internal components therein as described in further detail below.

FIG. 1B illustrates the exemplary gas spring assembly 10 in a neutral position relating to some embodiments. In the neutral position, the extension rod 14 is received into the extension housing 12, as shown, while the compression rod 16 still remains external to the extension rod 14, as shown. In some embodiments, the gas spring assembly 10 is biased into the neutral position, for example, as a result of a gas or other fluid disposed within the gas spring assembly 10. Accordingly, during use, when the gas spring assembly 10 is displaced from the neutral position, the gas spring assembly 10 will resist motion and bias the gas spring assembly 10 back to the neutral position. For example, responsive to fluid pressure internal to the gas spring assembly 10, the extension rod 14 may be biased into the extension housing 12 and the compression rod 16 may be biased out of the extension rod 14, as shown in the depicted neutral position.

In some embodiments, the gas spring assembly 10 is installed while in the neutral position, as shown. Because the gas spring assembly 10 has a nested arrangement in which a single component acts as both a gas spring rod and housing for yet another gas spring rod, the overall installation length is reduced, which makes installation easier and broadens the available installation options. Accordingly, an operator may install the gas spring assembly 10, for example, by mounting the connection points 18 and 20 within respective portions of a vehicle, while the gas spring assembly 10 is in the neutral position.

FIG. 1C illustrates the exemplary gas spring assembly 10 in a compressed position relating to some embodiments. In the compressed position, both the extension rod 14 is received in the extension housing 12 and the compression rod 16 is received into the extension rod 14, as shown. When the gas spring assembly 10 is in the compressed position, the overall length of the assembly is significantly reduced because the respective gas spring portions are nested within one another. For example, in some embodiments, the extension housing 12, the extension rod 14, and the compression rod 16 are telescopically connected such that the extension rod 14 telescopes in and out of the extension housing 12, and the compression rod 16 telescopes in and out of the extension rod 14, as shown in the different positions of FIGS. 1A-1C.

In some embodiments, during use, the gas spring assembly 10 may be pressed into the compressed position by external compressive forces acting through the connection points 18 and 20. For example, when the gas spring assembly 10 is installed within a vehicle steering system, an external force may be generated, for example, from road conditions or a sharp adjustment of the vehicle steering system.

Figures 2A, 2B, 2C:
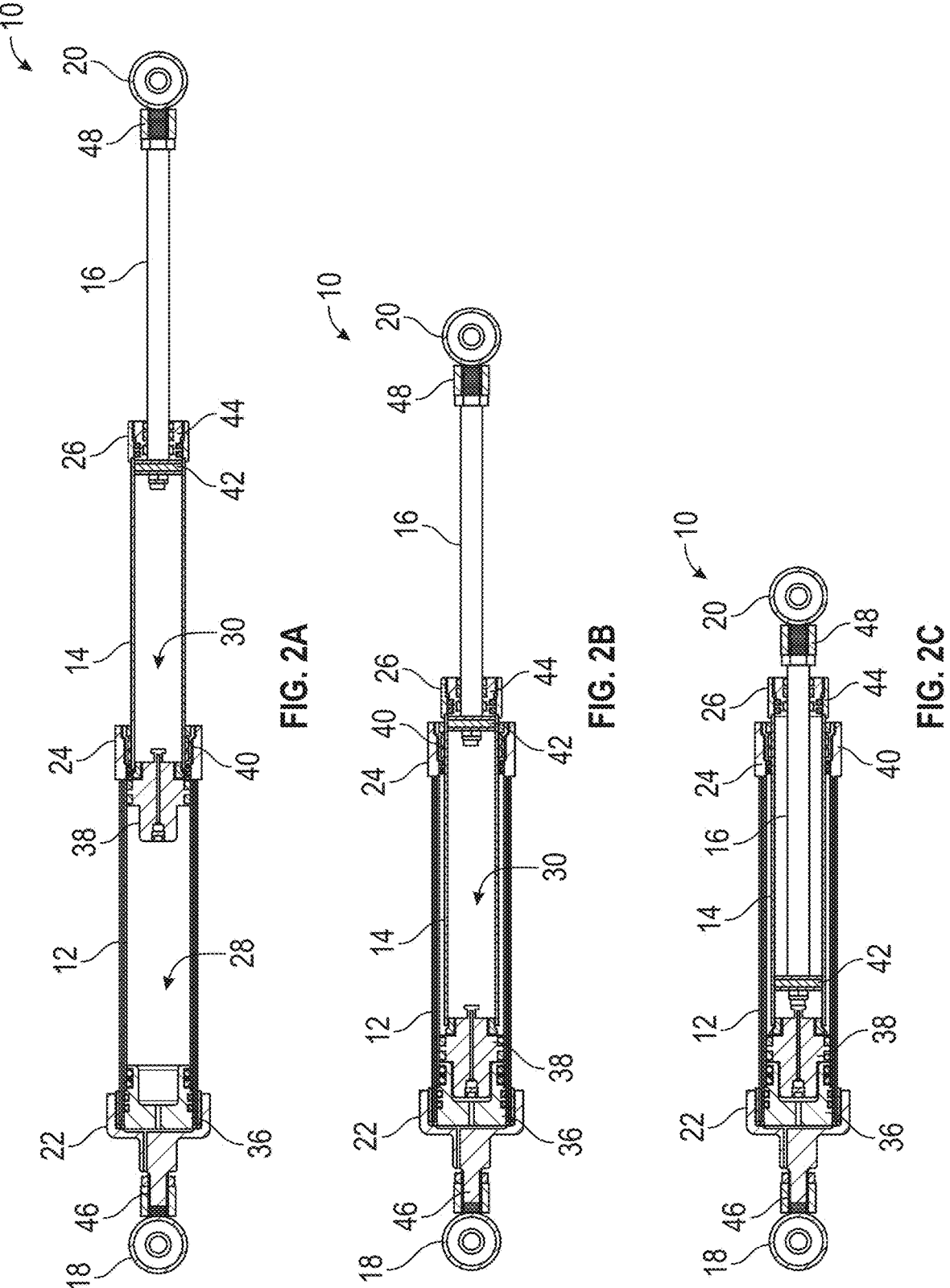
FIG. 2A illustrates a cross-sectional view of an exemplary gas spring assembly in an extended position relating to some embodiments.
FIG. 2B illustrates a cross-sectional view of an exemplary gas spring assembly in a neutral position relating to some embodiments.
FIG. 2C illustrates a cross-sectional view of an exemplary gas spring assembly in a compressed position relating to some embodiments.

FIGS. 2A-2C illustrate cross-sectional views of an exemplary gas spring assembly 10 in various operational positions relating to some embodiments. The gas spring assembly 10 includes similar components to as described above with respect to FIGS. 1A-1C. However, additional internal components are visible by way of the cross-sectional view, as will be described in greater detail below.

FIG. 2A illustrates a cross-sectional view of the exemplary gas spring assembly 10 in the extended position relating to some embodiments. The extension housing 12 comprises an extension housing cavity 28 therein, as shown. In some embodiments, the extension housing cavity 28 is configured to receive the extension rod 14, at least partially, and/or one or more fluids, such as, for example, an inert nitrogen gas. In some embodiments, the extension rod 14 comprises a compression housing cavity 30 therein, as shown. In some embodiments, the compression housing cavity 30 is configured to receive the compression rod 16, at least partially, and/or one or more fluids.

In some embodiments, the gas spring assembly 10 comprises an end plug 36 disposed in an end of the extension housing cavity 28, as shown. In some embodiments, the end plug 36 provides an end seal to the extension housing cavity 28. In some embodiments, the end plug 36 abuts an internal surface of the first collar 22, as shown. In some embodiments, the gas spring assembly 10 comprises an extension piston 38. The extension piston 38 may be coupled to an end of the extension rod 14, as shown. In some embodiments, the extension piston 38 also acts as an end stop to prevent the extension rod 14 from being fully separated from the extension housing cavity 28. In some embodiments, the end plug 36 comprises a hollow portion configured to receive an end portion of the extension piston 38 therein.

The gas spring assembly 10 may further comprise an extension rod seal 40 disposed internal to the second collar 24, as shown. In some embodiments, the extension rod seal 40 is sized for interference with the extension piston 38 such that the extension piston 38 is prevented from being removed from the extension housing cavity 28. For example, an inner diameter of the extension rod seal 40 may be smaller than an outer diameter of the extension piston 38.

In some embodiments, the gas spring assembly 10 comprises a compression piston 42 coupled to an end of the compression rod 16 and disposed in the compression housing cavity 30, as shown. In some embodiments, the compression piston 42 is coupled to the compression rod 16 via a bolt disposed through the end of the compression rod 16. Alternatively, or additionally, other suitable coupling techniques are also contemplated. Further, the third collar 26 may include a compression rod seal 44 disposed therein configured to seal around an outer surface of the compression rod 16. Additionally, in some embodiments, the compression rod seal 44 prevents the compression piston 42 from being removed from the compression housing cavity 30.

In some embodiments, any of the sealing components described herein may include one or more sealing rings such as O-rings. For example, one or more O-rings may be included on any of the end plug 36, the extension piston 38, the extension rod seal 40, the compression piston 42, and the compression rod seal 44.

In some embodiments, the gas spring assembly 10 further includes end couplings for coupling the gas spring assembly ends to the connection points. For example, a first end coupling 46 may couple the first collar 22 to the connection points 18 and a second end coupling 48 may couple an end of the compression rod 16 to the connection points 20. In some embodiments, the end couplings may comprise a threaded portion for providing a threaded connection to the connection points.

In some embodiments, in the extended position a vacuum effect is produced within the extension housing cavity 28 by expanding the gas within the extension housing cavity 28. The produced vacuum effect provides a pulling force to bias the gas spring assembly 10 into the neutral position.

FIG. 2B illustrates a cross-sectional view of the exemplary gas spring assembly 10 in the neutral position relating to some embodiments. As shown, in the neutral position the extension rod 14 is received into the extension housing cavity 28. In some embodiments, in the neutral position, an end of the extension piston 38 is received into an opening in the end plug 36, as shown.

In some embodiments, in the neutral position, the compression rod 16 remains outside of the compression housing cavity 30, as shown. The neutral position is associated with an equilibrium condition of the gas spring assembly 10. Accordingly, without external forces acting on the gas spring assembly 10, the gas spring assembly 10 will return to the neutral position. Further, in the case of external forces acting on the gas spring assembly 10, the gas spring components will act in an opposite direction to the external forces to return to the neutral position.

In vehicle steering scenarios, the neutral position may correspond to a center position of the vehicle steering system. As such, the gas spring assembly 10 may assist in returning the vehicle steering system to the center position by biasing into the neutral position, as described above.

FIG. 2C illustrates a cross-sectional view of the exemplary gas spring assembly 10 in the compressed position relating to some embodiments. In the compressed position, the end of the compression piston 42 may pushed against an end of the extension piston 38 within the compression housing cavity 30, as shown. In the compressed position, the gas within the compression housing cavity 30 is compressed and produces an opposite force to resist the compression. For example, if the external compressive force is removed, the compressed gas will expand to bias the gas spring assembly 10 into the neutral position.

In some embodiments, the gas pistons, such as the extension piston 38 or the compression piston 42 may include a piston orifice operable to allow gas to flow through the piston at a relatively low rate. The low flow rate of gas through the piston allows the gas spring assembly 10 to move while still providing resistance to movement. However, it should be understood that in some embodiments, a piston orifice is not included, and the piston provides a complete seal against the gas.

The exemplary gas spring assembly shown includes the compression portion nested within the extension portion; however, embodiments are contemplated in which the extension portion may be nested within the compression portion. Further, in some embodiments, in the neutral position, the compression rod is biased into the compression housing and the extension rod is biased out of the extension housing.

Figure 3:
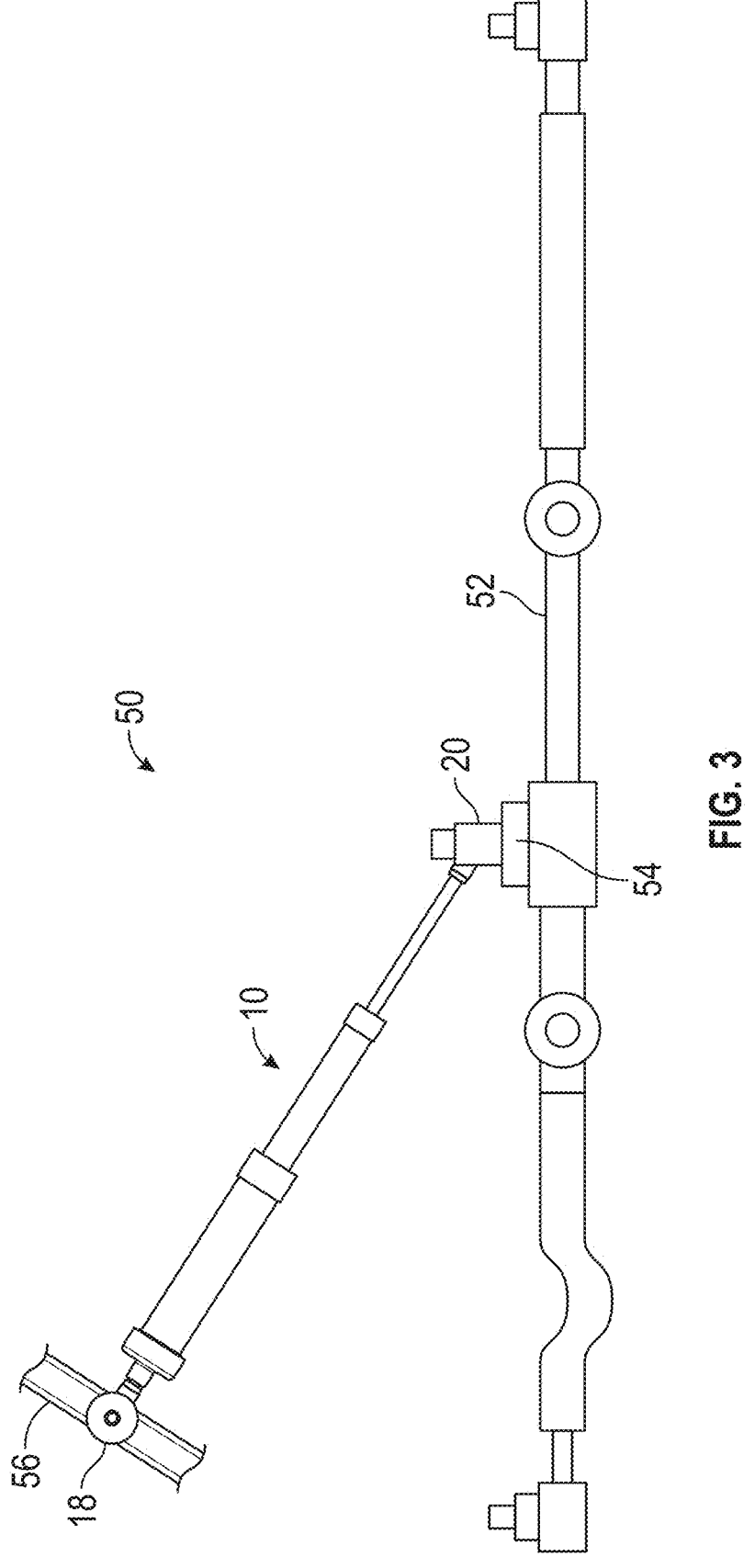
FIG. 3 illustrates an exemplary gas spring assembly installed within a vehicle steering system relating to some embodiments.

FIG. 3 illustrates the exemplary gas spring assembly 10 installed within a vehicle steering system 50 of a vehicle relating to some embodiments. It should be understood that other vehicle components may be included that are not explicitly illustrated. Further, in some embodiments, a variety of different installation techniques and locations may be used. The vehicle may be a solid front axle vehicle, for example, a vehicle designed for offroad use. In some embodiments, the vehicle is a towed vehicle being towed by a towing vehicle. Accordingly, the gas spring assembly 10 may be used as a centering member to maintain a center steering position of the towed vehicle during a towing operation.

In some embodiments, the gas spring assembly 10 is installed into the vehicle steering system 50 by attaching at multiple locations. For example, the connection point 20 may be attached to a tie rod 52 of the vehicle steering system 50. In some embodiments, the connection point 20 is secured to an attachment collar 54. For example, a bolt or another suitable fastener may be used to provide a removable connection between the connection point 20 of the gas spring assembly 10 and the attachment collar 54 of the tie rod 52.

In some embodiments, the connection point 18 of the gas spring assembly 10 is attached to another portion 56 of the vehicle. The portion 56 may be a portion of the vehicle that is fixed to the vehicle frame or fixed to the vehicle axle. In some embodiments, the connection point 18 may be coupled to a portion of the vehicle frame or another component fixed to the vehicle frame.

In some embodiments, the gas spring assembly 10 is installed in the neutral position. For example, the vehicle may be operated to turn the wheels to a centered position, then the gas spring assembly 10 is installed in the neutral position by securing the connection points 18 and 20 to respective portions of the vehicle. In some embodiments, after initial installation, the gas spring assembly 10 may be adjusted based on the center position of the vehicle steering system. For example, the vehicle may be driven in a straight travel path then stopped and the gas spring assembly 10 may be adjusted into the neutral position and locked into alignment such that the neutral position of the gas spring assembly 10 corresponds to the true center position of the vehicle steering system.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A nested gas spring assembly comprising:
   an extension housing including a hollow cavity therein;
   an extension rod including a compression housing with a hollow cavity therein, wherein at least a portion of the extension rod is received into the hollow cavity of the extension housing; and
   a compression rod with at least a portion thereof received into the hollow cavity of the compression housing of the extension rod,
   wherein the extension rod is biased into the hollow cavity of the extension housing via a first force provided by an expanded gas within the extension housing,
   wherein the compression rod is biased out of the hollow cavity of the compression housing of the extension rod via a second force provided by a compressed gas within the compression housing.

2. The nested gas spring assembly of claim 1, wherein, when in an extension position the extension rod extends out of the hollow cavity of the extension housing and the compression rod extends out of the hollow cavity of the compression housing.

3. The nested gas spring assembly of claim 1, further comprising:
   a first end of the nested gas spring assembly that is operable to be removably coupled to a portion of a vehicle steering assembly of a vehicle.

4. The nested gas spring assembly of claim 3, further comprising:
   a second end of the nested gas spring assembly that is opposite the first end and is operable to be removably coupled to another portion of the vehicle.

5. The nested gas spring assembly of claim 1, wherein the extension rod and the compression rod are biased into opposite directions.

6. The nested gas spring assembly of claim 1, further comprising:
   an extension piston disposed at an end of the extension rod, the extension piston sized to seal against an inner diameter of the extension housing.

7. The nested gas spring assembly of claim 6, further comprising:
   a compression piston disposed at an end of the compression rod, the compression piston sized to seal against an inner diameter of the compression housing.

8. The nested gas spring assembly of claim 7, further comprising a collar encompassing an end of the extension rod external to the extension housing, the collar comprising a compression rod seal to seal against an outer surface of the compression rod and prevent the compression piston from being removed from the compression housing.

9. A gas spring assembly for a vehicle steering stabilizer system, the gas spring assembly comprising:
   a compression housing including a hollow cavity;
   an extension rod; and
   a compression rod operable to be positioned within the hollow cavity of the compression housing, the compression rod comprising:
      an extension housing including a hollow cavity for receiving the extension rod therein, wherein the extension rod is biased into the hollow cavity of the extension housing of the compression rod via a first force provided by an expanded gas within the extension housing, wherein the compression rod is biased out of the hollow cavity of the compression housing via a second force provided by a compressed gas within the compression housing.

10. The gas spring assembly of claim 9, wherein in an extension position a substantial portion of the extension rod is external to the hollow cavity of the extension housing and a substantial portion of the compression rod is external to the hollow cavity of the compression housing.

11. The gas spring assembly of claim 10, wherein in a neutral position a substantial portion of the extension rod is internal to the hollow cavity of the extension housing and a substantial portion of the compression rod is external to the hollow cavity of the compression housing.

12. The gas spring assembly of claim 11, wherein in a compressed position a substantial portion of the extension rod is internal to the hollow cavity of the extension housing in the compression rod and a substantial portion of the compression rod is internal to the hollow cavity of the compression housing.

13. The gas spring assembly of claim 9, further comprising:

an extension piston disposed at an end of the extension rod, the extension piston sized to seal against an inner diameter of the extension housing, wherein the extension piston comprises a narrow end.

14. The gas spring assembly of claim 13, further comprising:

an end stop disposed at an end of the extension housing, the end stop comprising an opening for receiving the narrow end of the extension piston.

15. The gas spring assembly of claim 9, further comprising:

a compression rod seal disposed in the compression housing, the compression rod seal sized to seal against an outer diameter of the compression rod.

16. A nested gas spring assembly comprising:

an extension housing including a hollow cavity therein;

an extension rod including a compression housing with a hollow cavity therein, wherein at least a portion of the extension rod is received into the hollow cavity of the extension housing;

a compression rod with at least a portion thereof received into the hollow cavity of the compression housing of the extension rod;

a first collar encompassing a first end of the extension housing;

a second collar encompassing a second end of the extension housing opposite the first end; and a third collar encompassing an end of extension rod external to the extension housing, wherein in an extension position a substantial portion of the extension rod is external to the hollow cavity of the extension housing and a substantial portion of the compression rod is external to the hollow cavity of the compression housing, wherein in a neutral position a substantial portion of the extension rod is internal to the hollow cavity of the extension housing and a substantial portion of the compression rod is external to the hollow cavity of the compression housing, wherein in a compressed position a substantial portion of the extension rod is internal to the hollow cavity of the extension housing and a substantial portion of the compression rod is internal to the hollow cavity of the compression housing in the extension rod, wherein a first force provided by an expanded fluid within the extension housing biases the extension rod into the hollow cavity of the extension housing, and wherein a second force provided by a compressed fluid within the compression housing biases the compression rod out of the hollow cavity of the compression housing.

17. The nested gas spring assembly of claim 16, further comprising:

a compression rod seal disposed in the compression housing of the extension rod, the compression rod seal sized to seal against an outer diameter of the compression rod.

18. The nested gas spring assembly of claim 17, further comprising:

a compression piston disposed at an end of the compression rod within the compression housing of the extension rod, wherein the compression piston abuts the compression rod seal in the extension position to prevent the compression piston from being removed from the compression housing.

19. The nested gas spring assembly of claim 16, wherein the nested gas spring assembly is installed within a vehicle steering system of a vehicle.

20. The nested gas spring assembly of claim 19, wherein the nested gas spring assembly is in the neutral position while the vehicle steering system is in a center position.

* * * * *